J. E. MASSEY.
Ship's Log.

No. 206,682. Patented Aug. 6, 1878.

Witnesses:
Louise Massey
William Coates

Inventor:
John Edw.<sup>d</sup> Massey.

N. PETERS, PHOTO-LITHOGRAPHER, WASHINGTON, D. C.

J. E. MASSEY.
Ship's Log.

No. 206,682. Patented Aug. 6, 1878.

Witnesses.
Louisa Massey.
William Coates.

Inventor:
John Edw. Massey.

J. E. MASSEY.
Ship's Log.

No. 206,682.      Patented Aug. 6, 1878.

UNITED STATES PATENT OFFICE.

JOHN EDWARD MASSEY, OF CLERKENWELL, ENGLAND.

IMPROVEMENT IN SHIPS' LOGS.

Specification forming part of Letters Patent No. 206,682, dated August 6, 1878; application filed March 7, 1877; patented in England, October 21, 1876.

*To all whom it may concern:*

Be it known that I, JOHN EDWARD MASSEY, of 17 Chadwell Street, Clerkenwell, in the county of Middlesex, England, manufacturer of patent logs and sounding-machines, have invented new and useful Improvements in Ships' Logs and apparatus for holding same, which improvements are fully set forth in the following specification, reference being had to the accompanying drawings.

This invention relates to improvements in ships' logs and the apparatus for holding same; and consists in constructing an improved log and speed indicator or gage with the registering-gear inboard or adjacent to the deck of the vessel, with an improved mode or device for obviating or reducing friction and imparting additional strength and durability by the introduction of balls or spheres between the working-faces or bearing-plates of the terminal longitudinal shaft or arbor in the place of the rollers and other means hitherto adopted and used for the purpose, and the introduction of a spring or mechanical equivalent to permit an elongated action of the terminal longitudinal shaft or arbor, and allow it to expand or contract, so as to accommodate and adapt itself to the strain or pull of the rope or line attached to the rotator and the irregular tug, bight, and thrust thereof; also, an improved dial furnished with two graduated circles or scales and two hands or index-pointers acting from a common center, by means of which not only the distance traversed is indicated, but the present rates of speed of the vessel at any required moment can also be readily ascertained, and a sliding-groove holder to admit of the log being instantly applied or removed at will, and enable the recording wheels and mechanism, inclosed in a base, box, tube, or protector, called the "registering" part of the log, when attached to such holder, to project from the stern-quarter or other convenient part of the ship, so as to be influenced and operated on by the rotary action of the fly or winged cylinder in the water, called the "rotator," free from obstruction, and also permit such registering part of the log, by means of a joint which I designate a "knuckle-joint," to turn in any required direction and adjust itself to the correct angle for insuring the least strain and most efficient and favorable position for being acted upon by the rotator.

My said invention also includes the introduction and employment of such portions or parts of my aforesaid improvements as may be desirable or applicable for the purpose to logs generally, as well as to logs intended to register inboard or adjacent to the deck of the vessel, particularly the balls or spheres, the spring or mechanical equivalent, and the dial.

Figure 1 is a plan of case or box $a$, containing the train of wheels and registering-gear, with my improved dial $b$, furnished with two graduated circles or scales and two hands or index-pointers, $c$, of different or suitable lengths, acting from a common center, so as to pass one over the other. The outer circle or scale is divided to the one-sixtieth part of a mile, to show the present rates of speed of the vessel. By observing the number of divisions or sixtieth parts traversed by its index in one minute the speed of the vessel is ascertained. The inner circle or scale is divided to indicate any distance from one to one hundred miles. I employ the ordinary train of wheels and registering-gear, and carry the motion of the second forty-two-toothed wheel, $x$, to the center of the dial by means of an extra wheel, $x'$, as shown in Figs. 13 and 14, with the like number of teeth planted so as to gear or travel directly into the teeth of the second wheel. Such extra wheel being provided with the like number of teeth as the second wheel, their revolutions correspond and indicate one mile.

Fig. 2 represents a plan of the apparatus for holding the log-case or box containing the registering-gear, showing screw-holes for fixing; Fig. 3, front view thereof, showing recess or sliding groove; Fig. 4, side view; Fig. 5, transverse section through line 1 1, Fig. 4.

Such apparatus may be formed of brass or other metal or suitable material, so as to admit of being affixed or fastened by screws or other means to the side, stern, or other convenient part of the vessel.

The apparatus $e$ is provided with a recess, sliding groove, or locking, $f$, in which fits or slides vertically the stand-arm $d$, having attached thereto the log, case, or box containing the registering-gear.

Fig. 6 is a plan of a towing case or box, $g$, with cover removed, containing portion of the mechanism overboard in the water. At the front end is an eye-hole, $h$, through which is secured the rope or line for towing it. The interior of the case or box is furnished with an endless screw, $i$, with a cross-arm, $j$, at the end of it. The screw is planted in cocks, and a toothed wheel, $k$, is geared into it, a longitudinal shaft or arbor, $l$, consisting of a metal rod having at one end a circular face plate or bearing, $m$, at right angles. The inner or acting face of such plate or bearing is turned out or hollowed, so as to form a concave face. On the outside or contra face of the plate or bearing is a projecting arm or lug, which engages with or gathers up the cross-arm at the end of the screw. The other end of the shaft or arbor passes through the center of a hollow column, $n$, at the rear or aft end of the case or box. Working on the upper end of the hollow column is a loose cylinder, $o$, with the top part extended so as to form a circular face plate or bearing at right angles. Between the last-mentioned face-plate or bearing and the concave face-plate or bearing of the shaft or arbor are inserted four or any other convenient number of balls or spheres, $p$, hollow or solid, of metal or other suitable material. I prefer to use either four or five of such balls or spheres. These being free, and not held by pins, studs, or screws in any way, either to the shaft or to the face or bearing plates, revolve radially from the shaft, and act when and as required, with perfect ease and diminished friction. They are prevented from getting out of action by one of the face-plates or bearings being formed concaved, as above described.

To further facilitate the action of the balls or spheres and reduce the area of such action, a portion of the longitudinal shaft or arbor which is coincident with the balls or spheres may be slightly hollowed or turned, to adapt it to their diameter; or instead of my improved mode or device for obviating or reducing friction and imparting additional strength and durability by the introduction of balls or spheres, as above described, rollers or the other means hitherto adopted and used for the like purpose may be substituted and employed.

A metal open spiral spring, $q$, loosely fitting over the hollow column, one end resting against the inner surface of the rear end of the case or box, and the other against the edge of the cylinder working on the top end of the hollow column; but any other suitable spring or mechanical equivalent, either of metal or composed of india-rubber or other elastic substance, and constructed in various forms, according to the material adopted and adapted to the purpose, may be introduced and employed in the stead of the spiral spring without departing from this part of my invention, which comprises the introduction and employment of a spring or a mechanical equivalent of any form or substance adapted for adjusting and accommodating the terminable longitudinal shaft or arbor to the change or variation of the strain or pull of the rope or line attached to the rotator and the irregular tug, bight, and thrust thereof. My improved log may be used either with or without such spring or mechanical equivalent.

The longitudinal shaft or arbor, pushed or continued, as above described, through the hollow column which forms for it a socket or bush, and prevents lateral or askew motion, passes through or out of the aft part or rear of the case or box, and is retained in that position by a nut or collar, $r$, securely fixed by a pin or screw which traverses the nut or collar, and the longitudinal shaft or arbor. The nut or collar is furnished with an eye, loop, or ring for connecting it to the rotary rope or line fastened to the rotator; or the rotary rope or line may be dispensed with, and the rotator fixed to or brought into immediate connection with the endless screw, shaft, or arbor. The revolutions of the rotator being thus communicated through the shaft or arbor and endless screw to the toothed wheel (which is planted perpendicularly in the case or box) cause such wheel to turn on its pivots or axis. The upper one of such pivots, protected by a guard, is continued through the case or box and secured to a perpendicular rope or line, which is fastened, by means of a universal joint or ring, to the bottom of the end of the arbor of the first pinion in the other case or box containing the registering-gear.

The pivot, protected by the guard, may be secured to such perpendicular rope or line by either of the following or by any other suitable means: a short rod of metal formed with a ring at one end passes into the guard, having fixed at the other end a plate of metal forming a bearing at right angles, furnished with a projecting lug or arm which engages with a cross-arm attached to such pivot. Between the inner surface of the upper part or dome of the guard and the above-mentioned plate are inserted three or more balls or spheres; or, in lieu of the above arrangement, such pivot may be provided with a joint consisting of some pieces of metal linked together.

The underneath side or bottom of the case or box is made up of a sinker or keel of lead, iron, or other metal or substance in a V or any other suitable shape, leaving a hollow passage or way for the water to pass through, for the purpose of slightly submerging or sinking and steadying the case or box when towed in the water.

Fig. 7 is a transverse section through line 1 1, Fig. 6, showing the guard or protector $s$ to the pivot, and also V-shaped sinker $u$. Fig. 8 is a sectional view of my improved mode or device for obviating or reducing friction and imparting additional strength and durability, and also of the spring. Fig. 9 is a side view, showing stand-arm $d$ and universal joint or ring $t$, connected to perpendicular rope or line.

In using such improved machine at midships or more forward in vessels of short build, and where the shape of the hull will admit, a short spar, with a block or pulley slightly projecting from the vessel, may be fixed, or any other convenient means adopted. The first-mentioned rope or line—viz., the horizontal one for towing the case or box—is passed through such block and conveyed to the aft part or stern of the vessel over its side, clear of all impediments, and made fast to the front eyehole of the towing case or box, the rotating rope or line fastened to the rotator is secured to the eye, loop, or ring at the other end of the case or box. The perpendicular rope or line, which should be in length rather less than the depth from the bottom of the case or box containing the registering-gear inboard or adjacent to the deck of the vessel to the surface of the water, is secured through the aforesaid ring or joint connected with the pivot continued through the towing case or box. The rotator and towing case or box, so connected with the ropes or lines, are then committed to the water. The other end of the perpendicular rope or line is retained inboard, and quickly secured to the universal joint or ring at the end of the arbor of the first pinion part of the registering-gear contained in the case or box inboard or adjacent to the deck. This perpendicular rope or line will commence acting by quietly turning, and must not be impeded or obstructed. Its required length can be easily regulated and adjusted by either pulling up or letting out. Care should be taken not to leave it slack or too long. The end need not necessarily be cut off, but it may be simply tied or looped up; and care must also be taken that the towing case or box is brought to tow immediately under and in a direct or perpendicular line with the case or box containing the registering-gear inboard or adjacent to the deck. This is easily regulated by letting out or hauling in the towing rope or line.

The case, box, tube, or protector of the log $a$, containing the registering-gear and the whole of the mechanism (except the rotator) and the stand-arm $d$, are furnished with and attached by a joint, so as to admit of almost universal motion, (which I designate a knuckle-joint,) formed by a piece of metal of a stunted-cone shape, $v$, with a slot in the center, in which works a block of metal, $w$, attached to the upper part of the case, box, tube, or protector. The stunted-cone-shaped piece of metal is turned down to work in the end of the stand-arm, and secured by a nut or pin, and the block of metal is retained in its place by a pin and collet, or the position of the component parts of the joint may be reversed.

On the stand-arm being connected with the part of the holder fixed to the vessel by vertically sliding it into the recess or sliding groove, the log or registering part thereof is enabled freely to turn and incline in any required direction or angle.

Figure 1:
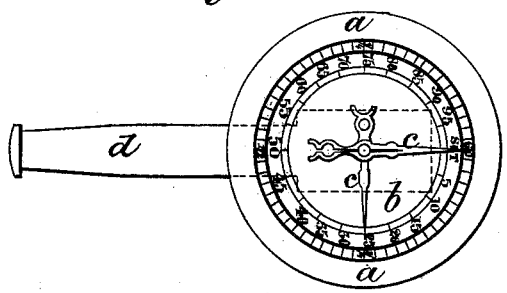
Figure 2:
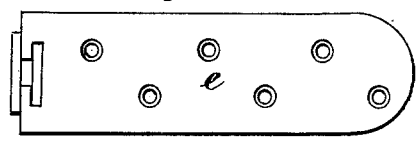
Figures 4, 5:
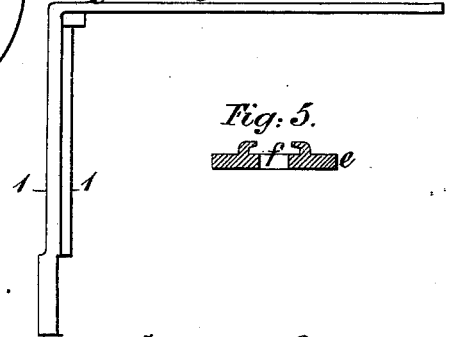
Figure 3:
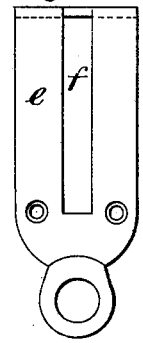
Figure 7:
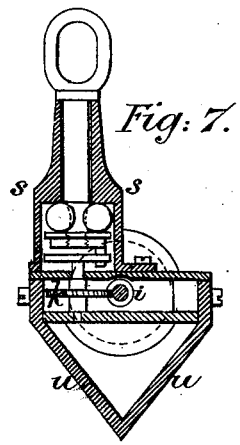
Figure 6:
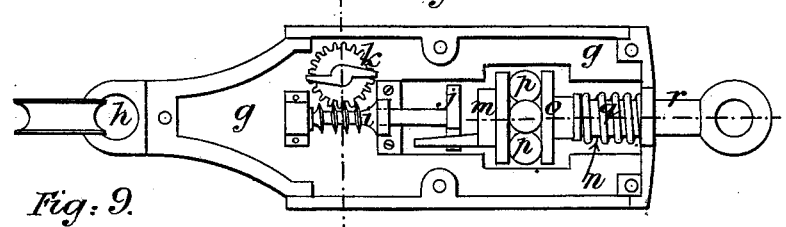
Figure 8:
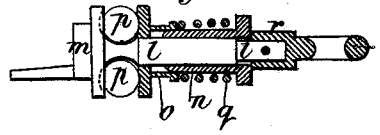
Figures 9, 10:
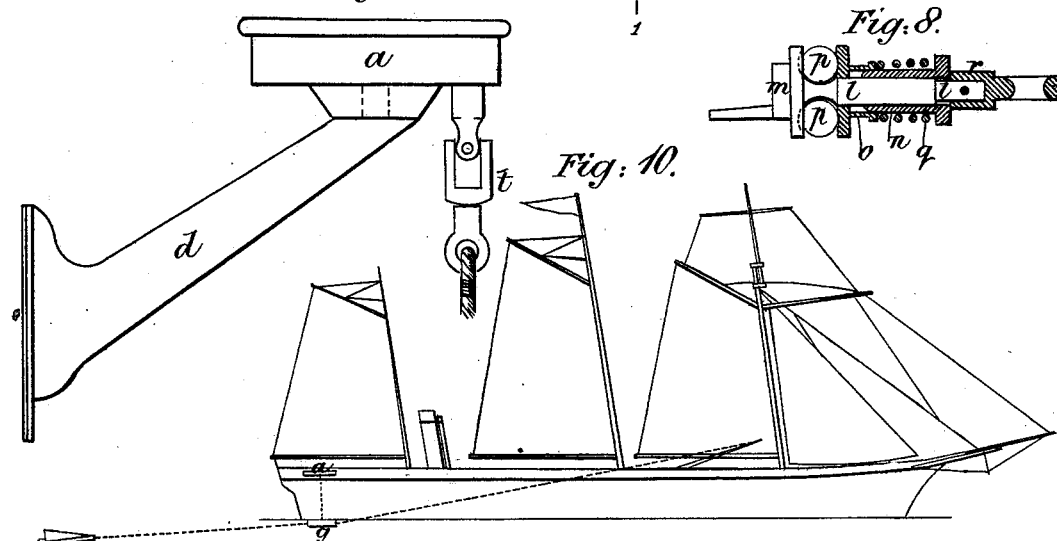
Fig. 10 is a diagram showing application of my said improved log and speed-indicator or gage.
Figure 11:
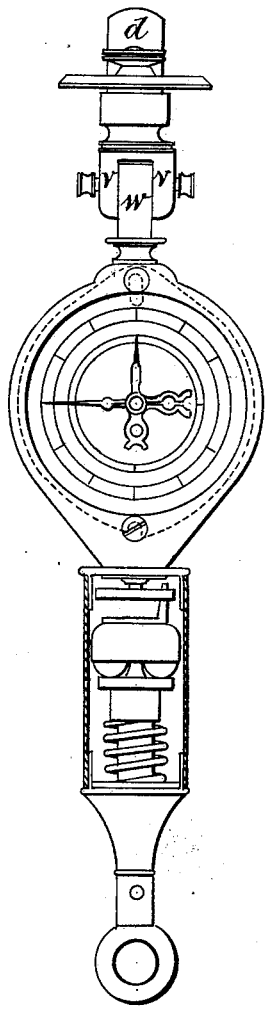
Fig. 11 is a front view, partly in section, of a modification of my improved log and apparatus when the rotator only is in the water, and the registering-gear and the whole of the other mechanism are inboard or adjacent to the deck of the vessel, showing knuckle-joint. In this view the log is shown in the position in which it would be when in use.
Figure 12:
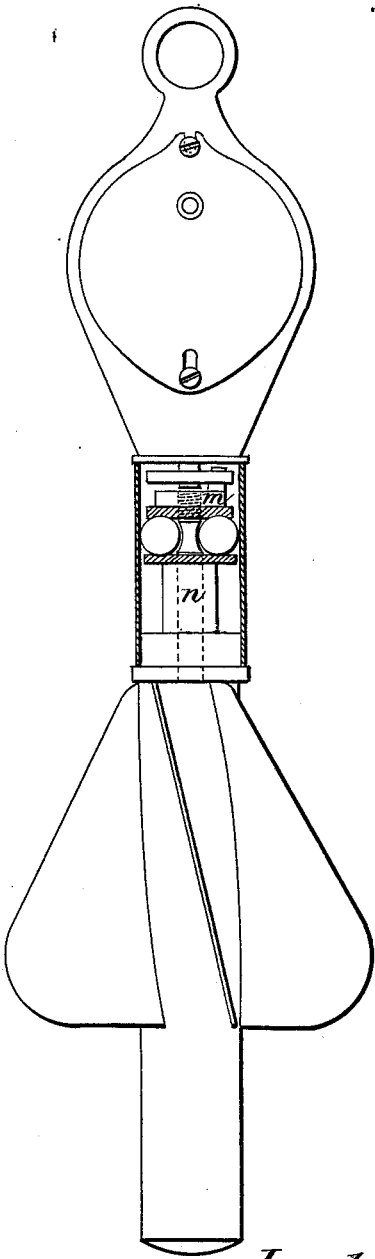

Fig. 12 is a front view of a log known as the "harpoon," with my improvements, and showing interior, with the improved mode or device for obviating or reducing friction and imparting additional strength and durability, by which it will be seen that when it is desired to apply that part of my invention—viz., the improved mode or device for obviating or reducing friction and imparting additional strength and durability to logs in which the rotator is immediately connected with the registering part of the log without the intervention or use of a rope or line, such as the logs known as "Massey's frictionless propeller-log," or as the above-mentioned "harpoon log," and to any other log not constructed to register inboard or adjacent to the deck of the vessel, the means hereinbefore described may be varied in the following manner: Instead of the loose cylinder, the upper end of the hollow column $n$ is extended so as to form a fixed plate or bearing at right angles thereto, and the plate or bearing $m$ at the lower end of the longitudinal shaft or arbor is not fixed, but movable, and attached to the shaft or arbor by means of a screw-thread, and the balls or spheres inserted between such two plates or bearings.

Figure 13:
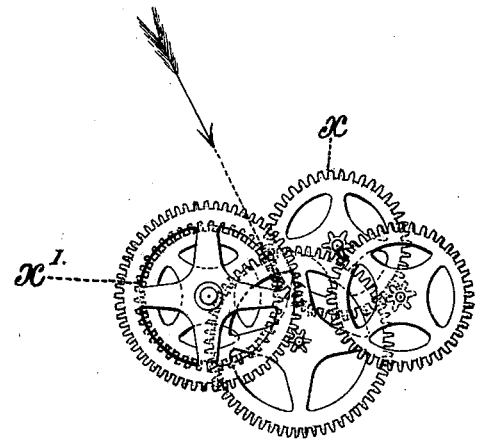
Figure 14:
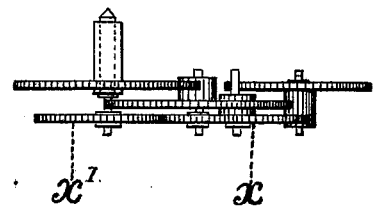

Fig. 13 represents a plan of extra forty-two-toothed wheel and second forty-two-toothed wheel and connections; Fig. 14, side view of same.

When my improved dial is used in conjunction with logs not constructed or adapted for registering inboard, known as the above-mentioned "harpoon log," or logs having part only of the tube or cylinder rotary, the circle or scale, divided into one-sixtieth part of a mile, may be dispensed with, and one circle or scale, divided to indicate any distance from one to one hundred miles, only used; and in place of the part or tube or cylinder which does not rotate, I substitute a flat box, case, or protector formed of an elliptical-shaped frame, of brass or other suitable metal or material, to receive the dial-index and other portions of the registering-gear, the rear end of the frame terminating in a cylindrical tubular shape, to admit of its being brought into connection by the usual mode with rotary part of the tube or cylinder.

Having thus described the nature of my said invention and the method of carrying the same into practical effect, what I desire to claim and secure is—

1. The combination of the holder or bracket $e f d$, and the joint $v w$ at the end of the bracket, and serving to support the registering part of the log, substantially as set forth.

2. The combination of the dial $b$, two hands, $c$, and extra wheel $x'$, planted to gear into the second forty-two-toothed wheel, $x$, of the ordinary train of wheels, substantially as set forth.

3. The spheres $p$, in combination with the shaft and face-plate, substantially as set forth.

4. The combination of a log and speed-gage with the following instrumentalities, viz., dial $b$, two hands, $c$, extra wheel $x'$, planted to gear into second forty-two-toothed wheel, $x$, of train of wheels, towing-case $g$, provided with a wheel, $k$, on the shaft and at right angles to same shaft, and connected to the indicating part of log and speed-gage by suitable intermediate mechanism, substantially as described.

5. The flat box or case with elliptical frame terminating cylindrically, in combination with dial $b$, two hands, $c$, and extra wheel planted to gear into second forty-two-toothed wheel, substantially as set forth.

6. The combination of same flat box or case with elliptical frame terminating cylindrically, with dial $b$, having one circle only thereon divided from one to one hundred miles, and one index-hand, $c$, substantially as set forth.

JOHN EDWD. MASSEY.

Witnesses:
  Louis Massey,
    16 *Harrist Road, Holloway,*
      *London, England.*
  William Coates,
    35 *Hanover Street, Islington,*
      *London, England.*